(12) United States Patent
Sato et al.

(10) Patent No.: US 9,768,430 B2
(45) Date of Patent: Sep. 19, 2017

(54) NON-WOVEN FABRIC BASE MATERIAL FOR LITHIUM ION SECONDARY BATTERY SEPARATOR AND LITHIUM ION SECONDARY BATTERY SEPARATOR

(71) Applicant: MITSUBISHI PAPER MILLS LIMITED, Tokyo (JP)

(72) Inventors: Tomohiro Sato, Tokyo (JP); Toshihiro Shigematsu, Tokyo (JP); Makoto Kato, Tokyo (JP); Kenji Hyodo, Tokyo (JP); Wakana Aizawa, Tokyo (JP)

(73) Assignee: MITSUBISHI PAPER MILLS LIMITED, Tokyo (JP)

( * ) Notice: Subject to any disclaimer, the term of this patent is extended or adjusted under 35 U.S.C. 154(b) by 0 days.

(21) Appl. No.: 14/763,967

(22) PCT Filed: Jan. 28, 2014

(86) PCT No.: PCT/JP2014/051780
§ 371 (c)(1),
(2) Date: Jul. 28, 2015

(87) PCT Pub. No.: WO2014/123033
PCT Pub. Date: Aug. 14, 2014

(65) Prior Publication Data
US 2015/0372269 A1 Dec. 24, 2015

(30) Foreign Application Priority Data

Feb. 5, 2013 (JP) ................................. 2013-020308
Dec. 19, 2013 (JP) ................................. 2013-262265
Dec. 20, 2013 (JP) ................................. 2013-263275

(51) Int. Cl.
*H01M 2/16* (2006.01)
*D04H 1/55* (2012.01)
*H01M 2/14* (2006.01)
*H01M 10/0525* (2010.01)
*H01M 10/052* (2010.01)

(52) U.S. Cl.
CPC ............ *H01M 2/162* (2013.01); *D04H 1/55* (2013.01); *H01M 2/145* (2013.01); *H01M 10/0525* (2013.01); *H01M 10/052* (2013.01)

(58) Field of Classification Search
CPC .. D04H 1/55; H01M 10/052; H01M 10/0525; H01M 2/145; H01M 2/162
See application file for complete search history.

(56) References Cited

U.S. PATENT DOCUMENTS

| | | | | |
|---|---|---|---|---|
| 4,217,441 A | * | 8/1980 | Bayless | G03C 1/7954 264/210.1 |
| 2002/0117394 A1 | | 8/2002 | Morokuma et al. | |
| 2003/0003363 A1 | * | 1/2003 | Daido | H01M 2/14 429/231.95 |
| 2006/0024569 A1 | | 2/2006 | Hennige et al. | |

FOREIGN PATENT DOCUMENTS

| | | | | |
|---|---|---|---|---|
| JP | 07-302584 | * | 11/1995 | ............. H01M 2/16 |
| JP | 2005-536857 | | 12/2005 | |
| JP | 2009-230975 | | 10/2009 | |
| JP | 2010-238448 | | 10/2010 | |
| JP | 2011-82148 | | 4/2011 | |
| JP | 2011-187346 | | 9/2011 | |

OTHER PUBLICATIONS

International Search Report issued Mar. 4, 2014 in International (PCT) Application No. PCT/JP2014/051780.
Writen Opinion of the International Searching Authority issued Mar. 4, 2014 in International (PCT) Application No. PCT/JP2014/051780.
Extended European Search Report issued Jan. 1, 2017 in corresponding European Application No. 14748767.2.

* cited by examiner

*Primary Examiner* — Patrick Ryan
*Assistant Examiner* — Ben Lewis
(74) *Attorney, Agent, or Firm* — Wenderoth, Lind & Ponack, L.L.P.

(57) ABSTRACT

A non-woven fabric base material for a lithium ion secondary battery separator composed mainly of a polyethylene terephthalate fiber, characterized in that the non-woven fabric base material comprises a polyethylene terephthalate binder fiber and a crystallized polyethylene terephthalate fiber, and the content of a polyethylene terephthalate binder fiber having a fiber length of 2.5 mm or less is 10 to 60 mass %.

8 Claims, No Drawings

NON-WOVEN FABRIC BASE MATERIAL FOR LITHIUM ION SECONDARY BATTERY SEPARATOR AND LITHIUM ION SECONDARY BATTERY SEPARATOR

TECHNICAL FIELD

This invention relates to a non-woven fabric base material for a lithium ion secondary battery separator, and a lithium ion secondary battery separator.

BACKGROUND ART

As a lithium ion secondary battery separator (sometimes abbreviated as "separator" hereafter) for a lithium ion secondary battery (sometimes abbreviated as "battery" hereafter), a porous film composed of a polyolefin resin such as polyethylene and polypropylene has been conventionally used. However, the resin-based porous film has had the problem that when a battery generates heat abnormally, the film melts and shrinks, and loses a function of separating positive and negative electrodes, which leads to a problem of causing a serious short circuit.

As a separator that is hard to melt and shrink even when a battery generates heat abnormally, there has been proposed a separator produced by coating various inorganic pigments onto a polyethylene terephthalate (PET) fiber-containing non-woven fabric base material for a lithium ion secondary battery separator (sometimes abbreviated as "non-woven fabric base material" hereafter) (for example, see Patent Documents 1-3).

Patent Document 1 describes a non-woven fabric base material comprising a fiber having a fiber diameter of 0.1 to 10 µm. Patent Document 2 describes a non-woven fabric base material comprising a crystallized PET fiber and a PET binder fiber, in which a short fiber having an average fiber diameter of 3 µm or less is contained as an essential component. Patent Document 3 describes a non-woven fabric base material comprising a crystallized PET fiber and a PET binder fiber, in which a fiber having a fiber length of 2 mm or less is contained as the crystallized PET fiber. However, each of non-woven fabric base materials disclosed in Patent Documents 1-3 has such problems that when it is intended to produce a separator whose thickness is small, the non-woven fabric base material is easy to be wrinkled during coating a coating liquid containing an inorganic pigment, which results in a decline in the productivity of the separator. For example, in Examples 2a to 2u in Patent Document 1, in order to produce a separator from a non-woven fabric base material having a thickness of 13 µm, there is used a complicatedly structured apparatus in which a non-woven fabric base material is conveyed while supporting said base material by a belt. Further, a coating liquid containing an inorganic pigment is coated on the base material at an extremely low line speed of 8 m/hr. In addition, there are cases where the coating liquid may penetrate though the base material, or there are cases where it may be difficult to achieve both low internal resistance and high tensile strength.

In addition, in each of the separators disclosed in Patent Documents 1-3, when the melting of a PET binder fiber is advanced to enhance the strength of the non-woven fabric base material, the PET binder fiber fills up pores inside the non-woven fabric base material, which lead to a problem that electrolyte retention worsens and a problem that the resistance of the separator becomes high.

PRIOR ART DOCUMENTS

Patent Documents

[Patent Document 1] JP 2005-536857 A
[Patent Document 2] JP 2009-230975 A
[Patent Document 3] JP 2011-82148 A

SUMMARY OF THE INVENTION

Problems to be Solved by the Invention

The present invention is to solve the above-mentioned problems. That is, the present invention aims at providing a non-woven fabric base material for a lithium ion secondary battery separator, which is hard to be wrinkled during coating a coating liquid containing an inorganic pigment, and can provide high productivity of the separator. Further, the present invention aims at providing a non-woven fabric base material for a lithium ion secondary battery separator, which is hard to cause the penetration-through of a coating liquid containing an inorganic pigment during coating the coating liquid, and can achieve both low internal resistance and high tensile strength. Furthermore, the present invention aims at providing a non-woven fabric base material for a lithium ion secondary battery separator, which has high strength and good electrolyte retention, and can lower the resistance of a separator.

Means to Solve the Problems

The above problems have been solved by the following invention.

(1) A non-woven fabric base material for a lithium ion secondary battery separator composed mainly of a polyethylene terephthalate fiber, characterized in that:
the non-woven fabric base material comprises a polyethylene terephthalate binder fiber and a crystallized polyethylene terephthalate fiber, and the content of a polyethylene terephthalate binder fiber having a fiber length of 2.5 mm or less is 10 to 60 mass %, (2) The non-woven fabric base material for a lithium ion secondary battery separator recited in claim 1, wherein the content of a polyethylene terephthalate binder fiber having an average fiber diameter of 14.0 µm or less and a fiber length of 0.5 to 2.5 mm is 21 to 60 mass %, (3) The non-woven fabric base material for a lithium ion secondary battery separator recited in claim 1,
wherein the content of a polyethylene terephthalate binder fiber having an average fiber diameter of 1.5 to 2.8 µm and a fiber length of 1.0 to 2.5 mm is 10 to 30 mass %;
the total content of the polyethylene terephthalate binder fiber and the crystallized polyethylene terephthalate fiber is 80 to 100 mass %; and
the average fiber diameter of the crystallized polyethylene terephthalate fiber is 2.0 to 4.0 µm, (4) A non-woven fabric base material for a lithium ion secondary battery separator composed mainly of a polyethylene terephthalate fiber, characterized in that:
the non-woven fabric base material comprises a polyethylene terephthalate binder fiber containing 3,5-dicarbomethoxy benzene sulfonic acid as a copolymer component, (5) A lithium ion secondary battery separator, produced by subjecting the non-woven fabric base material for a lithium ion secondary battery separator recited in any of claims 1 to 4 to at least one treatment selected from:

a treatment in which a coating liquid containing an inorganic pigment is coated;

a treatment in which a coating liquid containing an organic particle is coated;

a treatment in which a microporous resin film is laminated;

a treatment in which a fine fiber layer is formed by an electrospinning method; and a treatment in which a solid electrolyte or a gel-like electrolyte is coated.

Effect of the Invention

Since the non-woven fabric base material of the present invention is hard to be wrinkled during coating a coating liquid containing an inorganic pigment, there can be produced with high productivity a lithium ion secondary battery separator in which the inorganic pigment is coated on the non-woven fabric base material. Further since the non-woven fabric base material of the present invention is hard to cause the penetration-through of a coating liquid containing an inorganic pigment during coating the coating liquid, there can be produced a lithium ion secondary battery separator achieving both low internal resistance and high tensile strength. Furthermore, there can be produced a non-woven fabric base material for a lithium ion secondary battery separator having high strength and good electrolyte retention.

That is, the non-woven fabric base material for a lithium ion secondary battery separator composed mainly of a polyethylene terephthalate (PET) fiber comprises a PET binder fiber and a crystallized PET fiber, and the content of a PET binder fiber having a fiber length of 2.5 mm or less is 10 to 60 mass %, whereby the number of the PET binder fiber in the non-woven fabric base material increases, and the PET binder fiber can be distributed uniformly inside the non-woven fabric base material, which makes the base material less susceptible to be wrinkled during coating, and can improve the productivity of the separator.

Especially, when the non-woven fabric base material contains 21 to 60 mass % of a PET binder fiber having an average fiber diameter of 14.0 μm or less and a fiber length of 0.5 to 2.5 mm, the number of the PET binder fiber in the non-woven fabric base material further increases, and the PET binder fiber can be distributed more uniformly inside the non-woven fabric base material, which makes the base material less susceptible to be wrinkled during coating, and the effect of enhancing the productivity of the separator can be achieved.

Further, when the non-woven fabric base material contains a PET binder fiber having an average fiber diameter of 1.5 to 2.8 μm and a fiber length of 1.0 to 2.5 mm, both of the number of the PET binder fiber and the binding force per single fiber increase. For this reason, even at a small content of the PET binder fiber such as 10 to 30 mass %, sufficiently high strength can be realized, and as a result, low internal resistance can be attained. Further, when the average fiber diameter of a crystallized PET fiber is 2.0 to 4.0 μm, there can be obtained a suitably dense non-woven fabric base material, which can reduce the penetration-through of a coating liquid and can achieve low internal resistance.

In addition, when the non-woven fabric base material for a lithium ion secondary battery separator composed mainly of a PET fiber comprises a PET binder fiber containing 3,5-dicarbomethoxy benzene sulfonic acid as a copolymer component, the fibers can bond together without excessively filling up pores inside the non-woven fabric base material, and the high strength of the non-woven fabric base material for a lithium ion secondary battery separator can be obtained without worsening electrolyte retention.

DESCRIPTION OF EMBODIMENTS

[Non-Woven Fabric Base Material (1) for a Lithium Ion Secondary Battery Separator]

A non-woven fabric base material (1) is composed mainly of a PET fiber, and has a characterizing feature that it comprises a PET binder fiber and a crystallized PET fiber, and the content of a PET binder fiber having a fiber length of 2.5 mm or less is 10 to 60 mass %.

The non-woven fabric base material (1) contains a PET binder fiber. When the fiber length of the PET binder fiber is more than 2.5 mm, the non-woven fabric base material becomes easy to elongate, or the PET binder fiber becomes easy to tangle with each other, and the distribution thereof inside the non-woven fabric base material becomes un-uniform. For these reasons, such cases sometimes occur that the non-woven fabric base material becomes easy to be wrinkled during coating and the strength thereof becomes low. The length of the PET binder fiber is preferably 0.5 to 2.5 mm, more preferably 0.7 to 2.3 mm, and most preferably 1.0 to 2.0 mm.

The content of a PET binder fiber having a fiber length of 2.5 mm or less is 10 to 60 mass %. When the content thereof is less than 10 mass %, the strength of the non-woven fabric base material becomes low or the non-woven fabric base material becomes easy to be wrinkled. When the content thereof is more than 60 mass %, melted components fill up fine pores inside the non-woven fabric base material and the electrolyte retention of the non-woven fabric base material worsens. Further, the internal resistance of the non-woven fabric base material becomes high. The content of the PET binder fiber having a fiber length of 2.5 mm or less is preferably 15 to 50 mass %, more preferably 20 to 40 mass %, and most preferably 25 to 35 mass %.

The average fiber diameter of the PET binder fiber is preferably 0.1 to 14.0 μm. When the average fiber diameter thereof is less than 14.0 μm, the number of the fiber in the thickness direction increases, and the strength of the non-woven fabric base material becomes high. When the PET binder fiber is too thin or fine, it sometimes falls out of the non-woven fabric base material. Therefore, the average fiber diameter thereof is preferably 0.1 μm or more. In addition, the average fiber diameter of the PET binder fiber is more preferably 1.0 to 13.0 μm, further more preferably 1.5 to 10.0 μm, and most preferably 2.0 to 10.0 μm.

The term "average fiber diameter" mentioned here in the specification means an average value obtained by measuring equivalent circular diameter values of 20 fibers which form the non-woven fabric base material, from scanning electron microscopic images of the cross-section of the non-woven fabric base material, and thereafter averaging equivalent circular diameter values of smaller 10 fibers. The reason why only 10 smaller measured values are used is to exclude the measured values of the fibers which are cut far from a perpendicular line to the fiber longitudinal direction.

The PET binder fiber includes a composite fiber such as core-sheath type, eccentric core type, side-by-side type, sea-island type, orange type and multiple bimetal type, and a single component type fiber. In view of achieving uniformity, a single-component type heat-fusible fiber is especially preferable.

The non-woven fabric base material (1) contains a crystallized PET fiber. The content of the crystallized PET fiber is preferably 40 to 90 mass %, more preferably 50 to 85 mass %, further more preferably 60 to 80 mass %, and most preferably 65 to 75 mass %. When the content of the crystallized PET fiber is either less than 40 mass % or more than 90 mass %, the strength of the non-woven fabric base material sometimes becomes low.

The average fiber diameter of the crystallized PET fiber is preferably 0.1 to 10.0 µm, more preferably 0.5 to 9.0 µm, and further more preferably 1.0 to 8.0 µm. When the average fiber diameter thereof is less than 0.1 µm, the fiber is so thin or fine that it sometimes falls out of the non-woven fabric base material, and when the average fiber diameter thereof is more than 10.0 µm, it sometimes becomes difficult to make the separator thinner.

The fiber length of the crystallized PET fiber is preferably 1 to 10 mm, more preferably 2 to 7 mm, and further more preferably 3 to 5 mm. When the fiber length thereof is less than 1 mm, the strength of the non-woven fabric base material sometimes weakens, and when it is more than 10 mm, the fibers entangle and form lumps, and the thickness of the base material sometimes becomes un-uniform.

The non-woven fabric base material (1) is composed mainly of a PET fiber. In the non-woven fabric base material (1), the term "composed mainly of a PET fiber" means that the content of the PET fiber is 70 mass % or more. Further, other fibers than the PET fiber can be contained. For example, short fiber or fibrillated material of solvent-spun cellulose and regenerated cellulose; natural cellulose fiber; pulped material or fibrillated material of natural cellulose fiber; single fiber or composite fiber of polyolefin, acrylic resin, wholly aromatic polyester, wholly aromatic polyesteramide, polyamide, semi-aromatic polyamide, wholly aromatic polyamide, wholly aromatic polyether, wholly aromatic polycarbonate, wholly aromatic polyazomethine, polyimides, polyamideimide (PAI), polyetheretherketone (PEEK), polyphenylene sulfide (PPS), poly-p-phenylenebenzo-bisoxazole (PBO), polybenzimidazole (PBI), polytetrafluoroethylene (PIKE), ethylene-vinyl alcohol copolymer; and fibrillated material or divided material of single fiber or composite fiber consisting of these resins. One kind or two or more kinds of these fibers can be contained in the base material (1). The term "semi-aromatic" means that a chain such as fatty chain is partly contained in a main chain. Wholly aromatic polyamide can be either para-type or meta-type.

The basis weight of the non-woven fabric base material (1) is preferably 6.0 to 20.0 g/m$^2$, more preferably 8.0 to 18.0 g/m$^2$, and further more preferably 10.0 to 16.0 g/m$^2$. When it is more than 20.0 g/m$^2$, it sometimes becomes difficult to make the separator thinner, and when it is less than 6.0 g/m$^2$, it sometimes becomes difficult to obtain sufficient strength. The basis weight is measured based on the method defined in JIS P 8124 (Paper and board—Determination of basis weight).

The thickness of the non-woven fabric base material (1) is preferably 10 to 30 µm, more preferably 13 to 27 µm, and further more preferably 15 to 25 µm. When it is less than 10 µm, sufficient strength of the non-woven fabric base material cannot be obtained, and when it is more than 30 µm, it is difficult to make the separator thinner. The thickness is measured by an outside micrometer whose resolution is 0.001 mm, as defined in JIS B7502-1994.

[Non-Woven Fabric Base Material (2) for a Lithium Ion Secondary Battery Separator]

A non-woven fabric base material (2) has a characterizing feature that, in the non-woven fabric base material (1), the content of a PET binder fiber (sometimes abbreviated as "PET binder fiber (I)" hereafter) having an average fiber diameter of 14.0 µm or less and a fiber length of 0.5 to 2.5 mm is 21 to 60 mass %.

The term "average fiber diameter" mentioned here in the specification means an average value obtained by measuring equivalent circular diameter values of 20 fibers which form the non-woven fabric base material, from scanning electron microscopic images of the cross-section of the non-woven fabric base material, and thereafter averaging equivalent circular diameter values of smaller 10 fibers. The reason why only 10 smaller measured values are used is to exclude the measured values of the fibers which are cut far from a perpendicular line to the fiber longitudinal direction.

When the average fiber diameter of the PET binder fiber (I) is 14.0 µm or less, the number of the fiber in the thickness direction increases, and the strength of the non-woven fabric base material becomes high. When the PET binder fiber (I) is too thin or fine, it sometimes falls out of the non-woven fabric base material. Therefore, the average fiber diameter of the PET binder fiber (I) is preferably 0.1 µm or more. In addition, the average fiber diameter of the PET binder fiber (I) is more preferably 1.0 to 13.0 µm, and further more preferably 2.0 to 10.0 µm.

When the fiber length of the PET binder fiber (I) is less than 0.5 mm, the fiber sometimes falls out of the non-woven fabric base material. When the fiber length thereof is more than 2.5 mm, the non-woven fabric base material becomes easy to elongate, or the PET binder fiber (I) becomes easy to tangle with each other, and the distribution thereof inside the non-woven fabric base material becomes un-uniform. For these reasons, the non-woven fabric base material becomes easy to be wrinkled during coating. The length of the PET binder fiber (I) is preferably 0.7 to 2.3 mm, and more preferably 1.0 to 2.0 mm.

When the content of the PET binder fiber (I) is less than 21 mass %, the strength of the non-woven fabric base material becomes low or the non-woven fabric base material becomes easy to be wrinkled. When the content thereof is more than 60 mass %, melted components fill up fine pores inside the non-woven fabric base material and the electrolyte retention of the non-woven fabric base material worsens. The content of the PET binder fiber (I) is preferably 25 to 50 mass %, more preferably more than 30 mass % to 50 mass %, and most preferably 35 to 45 mass %.

The non-woven fabric base material (2) contains a crystallized PET fiber. The content of the crystallized PET fiber is preferably 40 to 79 mass %, more preferably 50 to 75 mass %, further more preferably 50 mass % to less than 70 mass %, and most preferably 55 to 65 mass %. When the content of the crystallized PET fiber is either less than 40 mass %, or more than 79 mass %, the strength of the non-woven fabric base material sometimes weakens.

The average fiber diameter of the crystallized PET fiber is preferably 0.1 to 10.0 µm, more preferably 0.5 to 9.0 µm, and further more preferably 1.0 to 8.0 µm. When the average fiber diameter thereof is less than 0.1 µm, the fiber is so thin or fine that it sometimes falls out of the non-woven fabric base material, and when it is more than 10.0 µm, it sometimes becomes difficult to make the separator thinner.

The fiber length of the crystallized PET fiber is preferably 1 to 10 mm, more preferably 2 to 7 mm, and further more preferably 3 to 5 mm. When the fiber length thereof is smaller than 1 mm, the strength of the non-woven fabric base material sometimes becomes low, and when it is more than 10 mm, the fibers tangle together and form lumps, and the thickness of the base material sometimes becomes un-uniform.

The non-woven fiber base material (2) can contain a PET binder fiber other than the PET binder fiber (I), but the content thereof is preferably 20 mass % or less. When the content thereof is more than 20 mass %, melted components of the PET binder fiber fill up fine pores inside the non-woven fabric base material and the resistance of a separator sometimes becomes high.

The PET binder fiber includes a composite fiber such as core-sheath type, eccentric core type, side-by-side type, sea-island type, orange type and multiple bimetal type, and a single component type fiber. In the view of achieving uniformity, a single-component type heat-fusible fiber is especially preferable.

The basis weight of the non-woven fabric base material (2) is preferably 6.0 to 20.0 g/m$^2$, more preferably 8.0 to 18.0 g/m$^2$, and further more preferably 10.0 to 16.0 g/m$^2$. When it is more than 20.0 g/m$^2$, it sometimes becomes difficult to make the separator thinner, and when it is less than 6.0 g/m$^2$, it sometimes becomes difficult to obtain sufficient strength. The basis weight is measured based on the method defined in JIS P 8124 (Paper and board—Determination of basis weight).

The thickness of the non-woven fabric base material (2) is preferably 10 to 30 μm, more preferably 13 to 27 μm, and further more preferably 15 to 25 μm. When it is less than 10 μm, sufficient strength of the non-woven fabric base material sometimes cannot be obtained, and when it is more than 30 μm, it is difficult to make the separator thinner. The thickness is measured by an outside micrometer whose resolution is 0.001 mm, as defined in JIS B7502-1994.

[Non-Woven Fabric Base Material (3) for a Lithium Ion Secondary Battery Separator]

A non-woven fabric base material (3) is characterized in that, in the non-woven fabric base material (1), the content of a PET binder fiber (sometimes abbreviated as "PET binder fiber (II)" hereafter) having an average fiber diameter of 1.5 to 2.8 μm and a fiber length of 1.0 to 2.5 mm is 10 to 30 mass %; the total content of the PET binder fiber and a crystallized PET fiber is 80 to 100 mass %; and the average fiber diameter of the crystallized PET fiber is 2.0 to 4.0 μm.

The term "average fiber diameter" mentioned here in the specification means an average value obtained by measuring equivalent circular diameter values of 20 fibers which form the non-woven fabric base material, from scanning electron microscopic images of the cross-section of the non-woven fabric base material, and thereafter averaging equivalent circular diameter values of smaller 10 fibers. The reason why only 10 smaller measured values are used is to exclude the measured values of the fibers which are cut far from a perpendicular line to the fiber longitudinal direction.

By using the PET binder fiber (II) with the average fiber diameter of 2.8 μm or less, the number of the PET binder fiber increases, the specific surface area of the PET binder fiber becomes large, and the binding force thereof is enhanced, which makes it possible to obtain sufficient strength even in such a small content of 30 mass % or less. However, in the non-woven fabric base material (3), even when a small amount of the PET binder fiber with a fiber diameter of more than 2.8 μm is contained, the above effects achieved by the non-woven fabric base material (3) are not greatly affected. Herein, the term "small amount" means that the content thereof is 15 mass % or less to the non-woven fabric base material.

Further, when a PET binder fiber with a small average fiber diameter such as the PET binder fiber (II) has a fiber length of more than 2.5 mm, the PET binder fibers become easy to tangle together, and the distribution thereof inside the non-woven fabric base material becomes un-uniform, which reduces the binding force thereof. As a result, it is not possible to obtain sufficient strength in such a small content of 30 mass % or less. However, in the non-woven fabric base material (3), even when a small amount of the PET binder fiber with a fiber length of more than 2.5 mm is contained, the above effects achieved by the non-woven fabric base material (3) are not greatly affected. Herein, the term "small amount" means that the content thereof is 10 mass % or less to the non-woven fabric base material.

By using the PET binder fiber (II) with the average fiber diameter of 1.5 μm or more, the PET binder fibers can be prevented from tangling together, and the distribution thereof inside the non-woven fabric base material can be uniform, which enhances the binding force thereof. As a result, it becomes possible to obtain sufficient strength in such a small content of 30 mass % or less. However, in the non-woven fabric base material (3), even when a small amount of the PET binder fiber with a fiber diameter of less than 1.5 μm is contained, the above effects achieved by the non-woven fabric base material (3) are not greatly affected. Herein, the term "small amount" means that the content of thereof is 5 mass % or less to the non-woven fabric base material.

By using the PET binder fiber (II) with the fiber length of 1.0 mm or more, the PET binder fiber can be prevented from falling out of the non-woven fabric base material, and as a result, it also becomes possible to obtain sufficient strength in such a small content of 30 mass % or less. In this view, the fiber length of the PET binder fiber (II) is more preferably 1.5 mm or more. However, in the non-woven fabric base material (3), even when a small amount of the PET binder fiber with a fiber length of less than 1.0 mm is contained, the effects achieved by the non-woven fabric base material (3) are not greatly affected. Herein, the term "small amount" means that the content of thereof is 5 mass % or less to the non-woven fabric base material.

When the content of the PET binder fiber (II) is less than 10 mass %, the strength of the non-woven fabric base material becomes low. In this view, the content of the PET binder fiber (II) is more preferably 15 mass % or more. When the content of the PET binder fiber (II) with a small average fiber diameter is more than 30 mass %, melted components fill up fine pores inside the non-woven fabric base material and the internal resistance sometimes becomes high. In this view, the content of the PET binder fiber (II) is preferably 30 mass % or less, and more preferably 25 mass % or less.

As the PET binder fiber (II), there can be used a single component type PET binder fiber staple, which is produced by firstly conducting melt-spinning to produce a sea-island type fiber filament which consists of a PET resin as an island component and a suitable solvent-soluble resin such as an aqueous alkaline solution-soluble polyester resin as a sea component; then eluting the sea component therefrom to produce a fiber with an average fiber diameter of 1.5 to 2.8 μm; and finally cutting the fiber obtained above with a suitable cutting apparatus so that the fiber length thereof becomes 1.0 to 2.5 mm. It is also possible that the sea-island type fiber filament is firstly cut so that the fiber length thereof becomes 1.0 to 2.5 mm, and then the sea component is eluted therefrom. As 1.5 long as the average fiber diameter is 1.5 to 2.8 µm and the fiber length is 1.0 to 2.5 mm, there can be used a composite PET binder fiber such as core-sheath type, eccentric core type, side-by-side type, sea-island type, orange type and multiple bimetal type, and a single-component type PET binder fiber, all of which are produced by other methods than the above-mentioned methods.

The non-woven fabric base material (3) contains the PET binder fiber (II) and a crystallized PET fiber in a total content of 80 to 100 mass %. In other words, other fibers than the PET binder fiber (II) and the crystallized PET fiber may be contained, but the content thereof is limited to 20 mass % or less. When the content of other fibers than the PET binder fiber (II) and the crystallized PET fiber is more than 20 mass %, the binding force between the PET binder fiber (II) and other fibers becomes lower, which makes it impossible to obtain a non-woven fabric base material with high strength. In this view, it is more preferable that the non-woven fabric base material (3) contains the PET binder fiber and a crystallized PET fiber in total content of 90 mass % or more.

In the non-woven fabric base material (3), a fiber with an average fiber diameter of 2.0 to 4.0 µm is used as the crystallized PET fiber. When the average fiber diameter thereof is less than 2.0 µm, the non-woven fabric base material is so dense that the internal resistance thereof becomes high. However, even when a small amount of the crystallized PET fiber with an average fiber diameter of less than 2.0 µm is contained, the above effects achieved by the non-woven fabric base material (3) are not greatly affected. Herein, the term "small amount" means that the content of thereof is 15 mass % or less to the non-woven fabric base material.

When the average fiber diameter of the crystallized PET fiber is more than 4.0 µm, the denseness of the non-woven fabric base material is insufficient, and the penetration-through of a coating liquid becomes easy to occur. In this view, the average fiber diameter of the crystallized PET fiber is preferably 3.5 µm or less. However, in the non-woven fabric base material (3), even when a small amount of the crystallized PET fiber with an average fiber diameter of more than 4.0 µm is contained, the above effects achieved by the non-woven fabric base material (3) are not greatly affected. Herein, the term "small amount" means that the content of thereof is 15 mass % or less to the non-woven fabric base material.

In the non-woven fabric base material (3), the fiber length of the crystallized PET fiber is preferably 2.5 to 6.0 mm. When the fiber length of the crystallized PET fiber is less than 2.5 mm, it sometimes becomes impossible to obtain suitable tensile strength. When it is more than 6.0 mm, the texture worsens due to tangling of the fibers, which may cause a high thickness defect that has an undesirable influence on its use as a separator.

The basis weight of the non-woven fabric base material (3) is preferably 6.0 to 12.0 g/m². When it is less than 6.0 g/m², it is sometimes difficult to obtain sufficient strength. When it is more than 12.0 g/m², it is sometimes difficult to make the separator thinner. The basis weight is measured based on the method defined in JIS P 8124 (Paper and board—Determination of basis weight).

The thickness of the non-woven fabric base material (3) is preferably 8 to 18 µm. When it is less than 8 µm, the penetration-through of a coating liquid becomes easy to occur, even in the non-woven fabric base material (3). When it is more than 18 µm, the internal resistance sometimes becomes high. In the present invention, the thickness of the non-woven fabric base material is measured by an outside micrometer whose resolution is 0.001 mm, as defined in JIS B7502-1994.

[Non-Woven Fabric Base Material (4) for a Lithium Ion Secondary Battery Separator]

A non-woven fabric base material (4) is composed mainly of a PET binder fiber, and comprises a PET binder fiber (sometimes abbreviated as "PET binder fiber (III)" hereafter) containing 3,5-dicarbomethoxy benzene sulfonic acid as a copolymer component.

The average fiber diameter of the PET binder fiber (III) is preferably 0.5 to 14.0 µm, more preferably 1.0 to 13.0 µm, and further more preferably 2.0 to 10.0 µm. When it is less than 0.5 µm, the fiber sometimes falls out of the non-woven fabric base material. When it is more than 14.0 µm, the number of the fiber in the thickness direction decreases, the strength of the non-woven fabric base material sometimes becomes low.

The term "average fiber diameter" mentioned here in the specification means an average value obtained by measuring equivalent circular diameter values of 20 fibers which form the non-woven fabric base material, from scanning electron microscopic images of the cross-section of the non-woven fabric base material, and thereafter averaging equivalent circular diameter values of smaller 10 fibers. The reason why only 10 smaller measured values are used is to exclude the measured values of the fibers which are cut far from a perpendicular line to the fiber longitudinal direction.

The fiber length of the PET binder fiber (III) is preferably 0.5 to 5.0 mm, more preferably 0.7 to 4.0 mm, and further more preferably 1.0 to 3.0 mm. When the length thereof is less than 0.5 mm, the fiber sometimes falls out of the non-woven fabric base material. When it is more than 5.0 mm, the fibers sometimes tangle together and form lumps, and the thickness sometimes becomes un-uniform.

The content of the PET binder fiber (III) is preferably 5 to 60 mass %, more preferably 10 to 55 mass %, and further more preferably 20 to 50 mass %. When the content thereof is less than 5 mass %, the strength of the non-woven fabric base material sometimes becomes low. When it is more than 60 mass %, melted components fill up the pores of the non-woven fabric base material, and as a result, such cases sometimes occur that the electrolyte retention of the non-woven fabric base material worsens or the resistance of the separator becomes high.

In view of achieving uniformity, the PET binder fiber (III) is preferably a single-component type heat-fusible fiber.

The PET binder fiber (III) may contain an alkyl glycol and the derivative thereof as a copolymer component other than 3,5-dicarbomethoxy benzene sulfonic acid. As the alkyl glycol and the derivative thereof, diethylene glycol is preferable.

It is preferred that the non-woven fabric base material (4) contains a crystallized PET fiber in addition to the PET binder fiber (III). The content of the crystallized PET fiber is preferably 40 to 95 mass %, more preferably 45 to 90 mass %, and further more preferably 50 to 80 mass %. When the content of the crystallized PET fiber is either less than 40 mass % or more than 95 mass %, the strength of the non-woven fabric base material sometimes becomes low.

The average fiber diameter of the crystallized PET fiber is preferably 0.5 to 10.0 µm, more preferably 0.7 to 8.0 µm, and further more preferably 1.0 to 6.0 µm. When the average fiber diameter thereof is less than 0.5 µm, the fiber is so thin or fine that it sometimes falls out of the non-woven fabric base material, and when it is more than 10.0 µm, it becomes more difficult to make the separator thinner.

The fiber length of the crystallized PET fiber is preferably 1 to 10 mm, more preferably 2 to 7 mm, and further more preferably 3 to 5 mm. When the fiber length thereof is less than 1 mm, the strength of the non-woven fabric base material sometimes becomes low, and it is more than 10 mm, the fibers tangle together and form lumps, and the thickness of the base material sometimes becomes un-uniform.

The non-woven fabric base material (4) may contain other PET binder fiber than the PET binder fiber (III), and the content thereof is preferably 20 mass % or less. When the content is more than 20 mass %, melted components of the PET binder fiber fill up the pores of the non-woven fabric base material, and as a result, such cases sometimes occur that the electrolyte retention of the non-woven fabric base material worsens or the resistance of the separator worsens.

The non-woven fabric base material (4) is composed mainly of a PET fiber. The term "composed mainly of a PET fiber" means that the content of the PET fiber is 70 mass % or more. Further, other fibers than the PET fiber can be contained. For example, short fiber or fibrillated material of solvent-spun cellulose and regenerated cellulose; natural cellulose fiber; pulped material or fibrillated material of natural cellulose fiber; single fiber or composite fiber of polyolefin, acrylic resin, wholly aromatic polyester, wholly aromatic polyesteramide, polyamide, semi-aromatic polyamide, wholly aromatic polyamide, wholly aromatic polyether, wholly aromatic polycarbonate, wholly aromatic polyazomethine, polyimides, polyamideimide (PAI), polyetheretherketone (PEEK), polyphenylene sulfide (PPS), poly-p-phenylenebenzo-bisoxazole (PBC)), polybenzimidazole (PBI), polytetrafluoroethylene (PTFE), ethylene-vinyl alcohol copolymer; and fibrillated material or divided material of single fiber or composite fiber consisting of these resins. One kind or two or more kinds of these fibers can be contained. The term "semi-aromatic" means that a chain such as fatty chain is partly contained in a main chain. Wholly aromatic polyamide can be either para-type or meta-type.

The basis weight of the non-woven fabric base material (4) is preferably 6.0 to 20.0 $g/m^2$, more preferably 8.0 to 18.0 $g/m^2$, and further more preferably 10.0 to 16.0 $g/m^2$. When it is more than 20.0 $g/m^2$, it sometimes becomes difficult to make the separator thinner, and when it is less than 6.0 $g/m^2$, it sometimes becomes difficult to obtain sufficient strength. The basis weight is measured based on the method defined in JIS P 8124 (Paper and board-Determination of basis weight).

The thickness of the non-woven fabric base material (4) is preferably 10 to 30 µm, more preferably 13 to 27 µm, and further more preferably 15 to 25 µm. When it is less than 10 µm, sufficiently high strength of the non-woven fabric base material sometimes cannot be obtained. When it is more than 30 µm, it sometimes becomes difficult to make the separator thinner. The thickness of the non-woven fabric base material is measured by an outside micrometer whose resolution is 0.001 mm, as defined in JIS B7502-1994.

[Non-Woven Woven Fabric Base Materials (1) to (4) for a Lithium Ion Secondary Battery Separator, and a Lithium Ion Secondary Battery Separator]

The non-woven woven fabric base materials (1) to (4) of the present invention are preferably used for the production of a separator in which a coating liquid containing an inorganic pigment has been coated onto the non-woven fabric base material. In addition, the non-woven woven fabric base materials (1) to (4) of the present invention may be used for the production of a separator in which a coating liquid containing an organic pigment has been coated onto the non-woven fabric base material; a separator in which a microporous resin film such as polyethylene microporous film and polypropylene microporous film has been laminated with the non-woven fabric base material; a separator in which a fine fiber layer has been formed on the non-woven fabric base material by an electrospinning method; and a separator in which a solid electrolyte or a gel-like electrolyte has been coated on the non-woven fabric base material. Like these, the non-woven fabric base materials (1) to (4) of the present invention are precursor sheets for a lithium ion secondary battery separator.

As the inorganic pigment, an inorganic oxide such as alumina, gibbsite, boehmite, magnesium oxide, magnesium hydroxide, silica, titanium oxide, barium titanate or zirconium oxide; an inorganic nitride such as aluminum nitride or silicon nitride; an aluminum compound; zeolite; and mica are exemplified.

As the organic particle, particles consisting of polyethylene, polypropylene, polyacrylonitrile, polymethyl methacrylate, polyethylene oxide, polystyrene, polyvinylidene fluoride, an ethylene-vinyl monomer copolymer, polyolefin wax or the like are exemplified.

A medium for preparing a coating liquid containing an inorganic pigment or an organic particle is not particularly limited as long as it can uniformly dissolve or disperse a binder, an inorganic pigment, an organic particle and the like. For example, there can be used aromatic hydrocarbons such as toluene; furans such as tetrahydrofuran; ketones such as methyl ethyl ketone; alcohols such as isopropyl alcohol; N-methyl-2-pyrrolidone (NMP); dimethylacetamide; dimethylformamide; dimethyl-sulfoxide; and water, as required. Further, these solvents may be used in the form of a mixture thereof, as required. In addition, as the medium to be used, the one does not swell or dissolve the non-woven fabric base material is preferred.

As a method of coating a coating liquid containing an inorganic pigment or an organic particle onto the non-woven fabric base material, for example, various coating methods such as blade, rod, reverse-roll, lip, die, curtain and air-knife; various printing methods such as flexographic, screen, offset, gravure and inkjet; transfer methods such as roll transfer and film transfer; and lifting methods such as dipping may be selected and used accordingly.

A porous film is not particularly limited as long as it is a film-formable resin. However, a polyolefin-based resin such as polyethylene-based resin and polypropylene-based resin is preferable. As the polyethylene-based resin, a sole polyethylene-based resin such as ultra-low density polyethylene, low density polyethylene, linear low density polyethylene, medium density polyethylene, high density polyethylene and ultra-high density polyethylene is exemplified. In addition, an ethylene-propylene copolymer, a mixture of a polyethylene-based resin and another polyolefin resin or the like are also exemplified. As the polypropylene-based resin, homo propylene polymer (a propylene homopolymer), a random copolymer or a block copolymer of propylene and α-olefin such as ethylene, 1-butene, 1-pentene, 1-hexene, 1-heptene, 1-octene, 1-nonene and 1-decene are exemplified.

The lithium ion secondary battery in the present invention is a general term of a secondary battery in which a lithium ion in an electrolyte solution is responsible for electrical conduction. As a negative electrode active material of the battery, a carbon material such as natural graphite, artificial graphite, hard carbon or coke; metallic lithium; an alloy of lithium with metal such as silicon, aluminum, tin, nickel or lead; a composite oxide of metal and lithium, such as lithium titanate, tin oxide or lithium silicate are exemplified. As a positive electrode active material, a composite oxide of transition metal and lithium, such as lithium cobalt oxide, lithium manganese oxide, lithium nickel oxide, lithium titanate or lithium nickel manganese oxide; olivine-type lithium iron phosphate; a composite oxide of one or more transition metals and lithium, or a composite oxide of one or more transition metals, one or more typical metals and lithium, such as a composite oxide of nickel-cobalt-manganese-lithium, a composite oxide of nickel-cobalt-manganese-lithium, a composite oxide of nickel-cobalt-aluminum-lithium, or a composite oxide of iron-manganese-nickel-lithium are exemplified.

As an electrolyte solution of the battery, there can be used a solution in which a lithium salt is dissolved in an organic solvent such as propylene carbonate, ethylene carbonate, dimethyl carbonate, diethyl carbonate, dimethoxyethane, dimethoxymethane or a mixture thereof. As the lithium salt, lithium hexafluorophosphate ($LiPF_6$), lithium tetrafluoroborate ($LiBF_4$) or the like are exemplified. Additives such as vinylene carbonate or boric acid esters may be added accordingly. In addition, there can be used a gelled electrolyte solution obtained by dissolving polymers such as polyethylene glycol or the derivative thereof, a polymethacrylate derivative, polysiloxane or the derivative thereof or polyvinylidene fluoride.

As a method of producing the non-woven fabric base materials (1) to (4), there can be used a method in which a non-woven fabric is produced by forming a fiber web, followed by adhering, fusing and entangling fibers inside the fiber web. The obtained non-woven fabric can be used either alone or in the form of a laminate consisting of plural sheets of fabrics. As a method of producing a fiber web, a dry-laid method such as a carding method, an air-laid method, a spunbonding method or a meltblowing method; a wet-laid method such as a paper-making method; an electrospinning method; or the like are exemplified. Of these, the fiber web obtained by the wet-laid method is uniform and dense, and it can be used suitably as a non-woven fabric base material for a lithium ion secondary battery separator. The wet-laid method is a method in which fibers are dispersed into water to form a uniform paper-making slurry, then fiber web is obtained by using a paper-making machine having at least one wire such as a cylinder wire, a Fourdrinier wire, an inclined-type wire and the like.

As a method of producing a non-woven fabric from a fiber web, there can be used a water-jet entangling method, a needle-punching method, a binder-bonding method or the like. Especially, when the wet-laid method mentioned above is used because of the uniformity, applying the binder-bonding method to bond PET binder fiber is preferred. By the binder-bonding method, a uniform non-woven fabric is formed from a uniform fiber web.

The non-woven fabric produced like this is preferably pressed by calendering or the like to adjust the thickness or to make the thickness uniform. Especially, when a thin separator with a thickness of 25 μm or less is to be produced, it is preferred to press the non-woven fabric by calendering or the like while heating it to make thin the thickness of the non-woven fabric base material. However, it is preferred that the non-woven fabric base material is pressed under a temperature at which the PET binder fiber does not form film (a temperature lower by 20° C. or more than a melting point or a softening point of the PET binder fiber).

According to the present invention, it is possible to produce a lithium ion secondary battery separator with a thickness of 25 μm or less, which in the prior art, has been difficult to produce with high productivity due to wrinkles occurring during coating and the penetration-through of a coating liquid. Especially, it is also possible to produce a lithium ion secondary battery separator with a thickness of 22 μm or less. Of course, it is also possible to produce easily a lithium ion secondary battery separator with a thickness of more than 25 μm. On the other hand, an extremely thin separator with a thickness such as 10 μm or less is difficult to produce even in the present invention. The thickness of the separator is measured by an outside micrometer whose resolution is 0.001 mm, as defined in JIS B7502-1994.

EXAMPLES

The present invention will be explained more in detail by the following examples, but the present invention is not limited to these examples.

Examples 1-13, Comparative Examples 1-3

[PET Binder Fiber A1]
As a PET binder fiber, there was used a single-component type undrawn PET fiber (softening point of 120° C., melting point of 230° C.) with an average fiber diameter of 4.3 μm and a fiber length of 0.5 mm.

[PET Binder Fiber A2]
As a PET binder fiber A2, there was used a single-component type undrawn PET fiber (softening point of 120° C., melting point of 230° C.) with an average fiber diameter of 4.3 μm and a fiber length of 1.5 mm.

[PET Binder Fiber A3]
As a PET binder fiber A3, there was used a single-component type undrawn PET fiber (softening point of 120° C., melting point of 230° C.) with an average fiber diameter of 4.3 μm and a fiber length of 2.5 mm.

[PET Binder Fiber A4]
As a PET binder fiber A4, there was used a single-component type undrawn PET fiber (softening point of 120° C., melting point of 230° C.) with an average fiber diameter of 14.0 μm and a fiber length of 2.5 mm.

[PET Binder Fiber A5]
As a PET binder fiber A5, there was used a single-component type undrawn PET fiber (softening point of 120° C., melting point of 230° C.) with an average fiber diameter of 1.0 μm and a fiber length of 1.0 mm.

[PET Binder Fiber A6]
As a PET binder fiber A6, there was used a core-sheath type heat-fusible PET fiber (melting point of sheath part: 110° C., core part: 250° C.) with an average fiber diameter of 7.2 μm and a fiber length of 2.0 mm.

[PET Binder Fiber A7]
As a PET binder fiber A7, there was used a single-component type undrawn PET fiber (softening point of 120° C., melting point of 230° C.) with an average fiber diameter of 4.3 μm and a fiber length of 0.3 mm.

[PET Binder Fiber A8]
As a PET binder fiber A8, there was used a single-component type undrawn PET fiber (softening point of 120° C., melting point of 230° C.) with an average fiber diameter of 4.3 μm and a fiber length of 3.0 mm.

[PET Binder Fiber A9]
As a PET binder fiber A9, there was used a single-component type undrawn PET fiber (softening point of 120°

C., melting point of 230° C.) with an average fiber diameter of 15.0 μm and a fiber length of 2.5 mm.

In accordance with fiber materials and fiber blending ratios shown in Table 1, each paper-making slurry was prepared. In Table 1, "B1" means a crystallized PET fiber with an average fiber diameter of 2.5 μm and a fiber length of 3 mm. "B2" means a crystallized PET fiber with an average fiber diameter of 3.2 μm and a fiber length of 3 mm. "B3" means a crystallized PET fiber with an average fiber diameter of 5.5 μm and a fiber length of 3 mm. "B4" means a crystallized PET fiber with an average fiber diameter of 7.8 μm and a fiber length of 5 mm. "C1" means a wholly aromatic polyamide fiber (copoly(para-phenylene-3,4'-oxy-diphenyleneterephthalic amide)) with a fineness of 0.75 dtex and a fiber length of 3 mm. "C2" means an acrylic fiber (an acrylonitrile-based copolymer consisting of acrylonitrile, methyl acrylate, and a methacrylic acid derivative) with a fineness of 0.10 dtex and a fiber length of 3 mm.

TABLE 1

| | Fiber blending ratio (mass %) | | | | | | | | | | | | | | |
|---|---|---|---|---|---|---|---|---|---|---|---|---|---|---|---|
| | PET binder fiber | | | | | | | | | Crystallized PET fiber | | | | Others | |
| | A1 | A2 | A3 | A4 | A5 | A6 | A7 | A8 | A9 | B1 | B2 | B3 | B4 | C1 | C2 |
| Average fiber diameter (μm) | 4.3 | 4.3 | 4.3 | 14.0 | 1.0 | 7.2 | 4.3 | 4.3 | 15.0 | | | | | | |
| Fiber length (mm) | 0.5 | 1.5 | 2.5 | 2.5 | 1.0 | 2.0 | 0.3 | 3.0 | 2.5 | | | | | | |
| Slurry 1 | 40 | | | | | | | | | 30 | 30 | | | | |
| Slurry 2 | | 40 | | | | | | | | 30 | 30 | | | | |
| Slurry 3 | | | 40 | | | | | | | 30 | 30 | | | | |
| Slurry 4 | | | | 21 | | | | | | | | | 79 | | |
| Slurry 5 | | 25 | | | | | | | | 75 | | | | | |
| Slurry 6 | | 31 | | | | | | | | 69 | | | | | |
| Slurry 7 | | 45 | | | | | | | | 55 | | | | | |
| Slurry 8 | | | 60 | | | | | | | | | | 40 | | |
| Slurry 9 | | | | 50 | | | | | | | | | 40 | 10 | |
| Slurry 10 | 40 | | | | | | | | | | | 30 | | | 30 |
| Slurry 11 | | 35 | | | 10 | | | | | | | 55 | | | |
| Slurry 12 | | | | | | 40 | | | | 30 | 30 | | | | |
| Slurry 13 | | | | | | | 40 | | | 30 | 30 | | | | |
| Slurry 14 | | | | | | | | 40 | | | | 60 | | | |
| Slurry 15 | | 8 | | | | | | | | | | | 92 | | |
| Slurry 16 | | 61 | | | | | | | | | | | 39 | | |

[Non-Woven Fabric Base Material]

Examples 1-3, 5-13

Each of slurries 1-3, 5-12 and 14 was paper-made by the wet-laid method with a cylinder wire and inclined wire combination paper making machine at a speed of 18 m/min to produce each of the non-woven fabric base materials of Examples 1-3, 5-12 and 13 shown in Table 2. The thickness was adjusted by conducting a heat calendering treatment with a heat calendering apparatus having metal roll-resin roll (Shore hardness D92) constitution under the conditions of a metal roll temperature of 195° C., a liner pressure of 200 kN/m, a processing speed of 10 m/min and 1 nip.

Example 4

Slurry 4 was paper-made by the wet-laid method with a cylinder wire and inclined wire combination paper making machine at a speed of 18 m/min to produce a non-woven fabric base material of Example 4 shown in Table 2. The thickness was adjusted by conducting a heat calendering treatment with a heat calendering apparatus having metal roll-resin roll (Shore hardness D92) constitution under the conditions of a metal roll temperature of 195° C., a liner pressure of 100 kN/m, a processing speed of 10 m/min and 1 nip.

Comparative Examples 1 and 3

Each of slurries 13 and 16 was paper-made by the wet-laid method with a cylinder wire and inclined wire combination paper making machine at a speed of 18 m/min to produce each of the non-woven fabric base materials of Comparative Examples 1 and 3 shown in Table 2. The thickness was adjusted by conducting a heat calendering treatment with a heat calendering apparatus having metal roll-resin roll (Shore hardness D92) constitution under the conditions of a metal roll temperature of 195° C., a liner pressure of 200 kN/m, a processing speed of 10 m/min and 1 nip.

Comparative Example 2

Slurry 15 was paper-made by the wet-laid method with a cylinder wire and inclined wire combination paper making machine at a speed of 18 m/min to produce a non-woven fabric base material of Comparative Example 2 shown in Table 2. The thickness was adjusted by conducting a heat calendering treatment with a heat calendering apparatus having metal roll-resin roll (Shore hardness D92) constitution under the conditions of a metal roll temperature of 195° C., a liner pressure of 100 kN/m, a processing speed of 10 m/min and 1 nip.

TABLE 2

| | | Non-woven fabric base material | | |
|---|---|---|---|---|
| | Slurry | Basis weight (g/m$^2$) | Thickness (μm) | Density (g/cm$^3$) |
| Example 1 | 1 | 10 | 15 | 0.67 |
| Example 2 | 2 | 10 | 15 | 0.67 |

TABLE 2-continued

|  | Slurry | Non-woven fabric base material | | |
|---|---|---|---|---|
|  |  | Basis weight (g/m$^2$) | Thickness (μm) | Density (g/cm$^3$) |
| Example 3 | 3 | 10 | 15 | 0.67 |
| Example 4 | 4 | 12 | 25 | 0.48 |
| Example 5 | 5 | 16 | 24 | 0.67 |
| Example 6 | 6 | 16 | 24 | 0.67 |
| Example 7 | 7 | 16 | 24 | 0.67 |
| Example 8 | 8 | 12 | 20 | 0.60 |
| Example 9 | 9 | 6 | 10 | 0.60 |
| Example 10 | 10 | 20 | 30 | 0.67 |
| Example 11 | 11 | 15 | 23 | 0.65 |
| Example 12 | 12 | 10 | 15 | 0.67 |
| Comparative Example 1 | 13 | 10 | 15 | 0.67 |
| Example 13 | 14 | 10 | 15 | 0.67 |
| Comparative Example 2 | 15 | 12 | 25 | 0.48 |
| Comparative Example 3 | 16 | 12 | 20 | 0.60 |

[Tensile Strength]

Each of the non-woven fabric base materials of Examples and Comparative Examples was cut into a rectangle with 50 mm width and 200 mm length so that the long side thereof was along the flow direction, and each of specimens was elongated with a tabletop material testing instrument (trade name: STA-1150, supplied by Orientech Co., Ltd.) under the conditions of a grip distance of 100 mm and a tensile speed of 300 ram/min. A load value at the break of the specimen was defined as tensile strength. The tensile strength was measured at five or more points per specimen, and an average value of all values measured was shown in Table 3.

[Electrolyte Retention]

Each of non-woven fabric base materials of Examples and Comparative Examples was cut into a 100 mm×100 mm specimen, and the weight (W1) thereof was measured, then the specimen was immersed in propylene carbonate for 1 minute, then hanged for 1 minute, and the weight (W2) thereof was measured, then electrolyte retention ratio was calculated by the Formula 1 below.

Electrolyte retention ratio (%)=(W2−W1)/W1×100  (Formula 1)

The electrolyte retention ratio was measured 2 or more times per specimen. When an average value of the measured values was 300% or more, the evaluation thereof was expressed as "A". When said value was 270% or more and less than 300%, it was expressed as "B". When said value was less than 270%, it was expressed as "C".

[Wrinkle During Coating]

100 mass parts of boehmite with a volume average particle diameter of 0.9 μm and a BET specific surface area of 5.5 m$^2$/g was dispersed into 150 mass parts of water, then 75 mass parts of an aqueous solution containing 2 mass % of carboxymethyl cellulose sodium salt, in which the viscosity of an aqueous 1 mass % solution thereof at 25° C. was 200 mPa·s, was added and stirred, then 10 mass parts of an emulsion (solid concentration: 50 mass %) of carboxy-modified styrene-butadiene copolymer resin with a glass transition temperature of −18° C. and a volume average particle diameter of 0.2 μm was added and stirred, then finally adjusting water was added to adjust a solid concentration to 25 mass % to produce a coating liquid A.

Onto the resin roll surface of each of the non-woven fabric base materials of Examples and Comparative Examples, using a reverse gravure coater as a coating machine, the coating liquid A was one side coated at a line speed of 30 m/min so that a coating amount of the liquid was 47 g/m$^2$. The coated non-woven fabric base materials was dried by blowing 90° C. hot air in a floating air dryer directly connected to the reverse gravure coater to obtain a separator. An evaluation of "wrinkling during coating" was carried out by examining the occurrence of wrinkles in each separator observed when the separator was wound up to the 500 m length with a reeler, and classifying it according to the following three criteria.

○: No wrinkles during coating were seen.
Δ: A few wrinkles during coating were seen.
x: Many wrinkles during coating were seen.

TABLE 3

|  | Tensile Strength (N/m) | Electrolyte retention | Separator Thickness (μm) | Wrinkling during coating |
|---|---|---|---|---|
| Example 1 | 700 | A | 18 | ○ |
| Example 2 | 764 | A | 19 | ○ |
| Example 3 | 730 | A | 19 | Δ |
| Example 4 | 695 | A | 26 | Δ |
| Example 5 | 983 | A | 26 | ○ |
| Example 6 | 1081 | A | 26 | ○ |
| Example 7 | 1222 | A | 27 | ○ |
| Example 8 | 831 | B | 25 | ○ |
| Example 9 | 682 | A | 11 | ○ |
| Example 10 | 1460 | A | 30 | ○ |
| Example 11 | 1120 | A | 25 | ○ |
| Example 12 | 590 | A | 20 | ○ |
| Comparative Example 1 | 719 | A | 19 | X |
| Example 13 | 585 | A | 17 | ○ |
| Comparative Example 2 | 380 | A | 28 | X |
| Comparative Example 3 | 836 | C | 27 | ○ |

Each of the non-woven fabric base materials produced in Examples 1-13 shown in Table 3 is corresponding to the non-woven fabric base material (1), since it is composed mainly of a PET fiber and comprises a PET binder fiber and a crystallized PET fiber, and the content of a PET binder fiber with a fiber length of 2.5 mm or less is 10 to 60 mass %. Thus, since each of the non-woven fabric base materials of Examples 1-13 has a small elongation and has the uniform distribution of the PET binder fiber therein, the wrinkling during coating could be prevented, and a lithium ion secondary battery separator in which an inorganic pigment was coated onto the non-woven fabric base material could be produced with high productivity.

Each of the non-woven fabric base materials produced in Examples 1-11 is also corresponding to the non-woven fabric base material (2), which is composed mainly of a PET fiber and contains 21 to 60 mass % of the PET binder fiber (I) with an average fiber diameter of 14.0 μm or less and a fiber length of 0.5 to 2.5 mm. Thus, since each of the non-woven fabric base materials of Examples 1-11 has a small elongation and has the uniform distribution of the PET binder fiber therein, the wrinkling during coating can be prevented more effectively compared with the non-woven fabric base materials produced in Examples 12 and 13, and a lithium ion secondary battery separator in which an inorganic pigment was coated onto the non-woven fabric base material could be produced with higher productivity. In the non-woven fabric base material produced in Example 12, the fiber length of the PET binder fiber was less than 0.5 mm, and as a result, the fiber slightly fell out of the non-woven fabric base material and the tensile strength of the non-woven fabric base material became slightly low compared with those of the non-woven fabric base materials produced in Examples 1-11. In the non-woven fabric base material produced in Example 13, the average fiber diameter of the PET binder fiber was more than 14.0 μm, and as a result, the number of the fiber in the thickness direction decreased and the tensile strength of the non-woven fabric base material became low compared with those of the non-woven fabric base materials produced in Examples 1-11.

In the non-woven fabric base material produced in Comparative Example 1, the fiber length of the PET binder fiber was more than 2.5 mm, and as a result, not only the non-woven fabric base material was liable to elongate, but also the PET binder fibers tangled together. Thus, wrinkling likely occurred and the productivity thereof was low.

With the non-woven fabric base material produced in Comparative Example 2 having the PET binder fiber content of less than 10 mass %, wrinkling during coating likely occurred and the productivity of the separator was low. The non-woven fabric base material produced in Comparative Example 3 had the PET binder fiber content of more than 60 mass %, and as a result, melted components fill up fine pores and the electrolyte retention worsened.

Hereafter, the non-woven fabric base materials produced in Examples 1-11 are compared. The non-woven fabric base material produced in Example 1 had a slightly small fiber length of the PET binder fiber, the non-woven fabric base material produced in Example 4 had a slightly large average fiber diameter of the PET binder fiber, and the non-woven fabric base material produced in Example 9 had a slightly small basis weight. As a result, the non-woven fabric base materials produced in Examples 1, 4 and 9 had slightly low tensile strengths compared with the non-woven fabric base materials produced in Examples 2, 3, 5-8, 10 and 11.

The non-woven fabric base material produced in Example 8 has a slightly large content of the PET binder fiber (I) with an average fiber diameter of 14.0 μm or less and a fiber length of 0.5 to 2.5 mm, the electrolyte retention thereof is slightly inferior to those of the non-woven fabric base materials produced in Examples 1-7 and 9-11.

The non-woven fabric base material produced in Example 3 had a slightly large fiber length of the PET binder fiber, and the non-woven fabric base material produced in Example 4 had a slightly smaller content of the PET binder fiber with an average fiber diameter of 14.0 μm or less and a fiber length of 0.5 to 2.5 mm, and as a result, the wrinkle formation during coating was relatively easy to occur compared with the non-woven fabric base materials produced in Examples 1, 2 and 5-11.

Examples 14-29, Comparative Examples 4 and 5

[PET Binder Fiber (Average Fiber Diameter of 1.3 μm)]
A binder fiber with an average fiber diameter of 1.3 μm was produced by cutting filaments produced by eluting a sea component from a sea-island type fiber, to a predetermined length.

[PET Binder Fiber (Average Fiber Diameter of 1.6 μm)]
A binder fiber with an average fiber diameter of 1.6 μm was produced by cutting filaments produced by eluting a sea component from a sea-island type fiber, to a predetermined length.

[PET Binder Fiber (Average Fiber Diameter of 2.8 μm)]
A binder fiber with an average fiber diameter of 2.8 μm was produced by cutting filaments produced by eluting a sea component from a sea-island type fiber, to a predetermined length.

[PET Binder Fiber (Average Fiber Diameter of 4.3 μm)]
A binder fiber with an average fiber diameter of 4.3 μm was produced by cutting filaments produced by a melt-spinning method, to a predetermined length.

[Crystallized PET Fiber 24]
As a drawn crystallized PET fiber 24, there was used a crystallized PET staple (softening point of 250° C.) which was produced by cutting filaments with an average fiber diameter of 2.4 μm produced by a melt-spinning method, to a length of 3.0 mm.

[Crystallized PET Fiber 16]
As a drawn crystallized PET fiber 16, there was used a crystallized PET staple (softening point of 250° C.) which was produced by cutting filaments with an average fiber diameter of 1.6 μm produced by eluting a sea component from a sea-island type fiber, to a length of 3.0 mm.

[Crystallized PET Fiber 43]
As a drawn crystallized PET fiber 43, there was used a crystallized PET staple (softening point of 250° C.) which was produced by cutting filaments with an average fiber diameter of 4.3 μm produced by a melt spinning method, to a length of 3.0 mm.

[Cellulose Fiber]
A lyocell (solvent-spun cellulose) fiber which was beaten to a Canadian standard freeness of 50 ml with a double disk refiner was used.

[Aramid Fiber]
A para-aramid fiber which was beaten to a Canadian standard freeness of 250 ml with a double disk refiner was used.

[Paper-Making]
In accordance with fiber materials and fiber blending ratios as shown in Tables 4 and 5, paper-making slurries were prepared. Each slurry was made into paper at a speed of 8 m/min with an inclined-type wire paper making machine so that the basis weight after drying was 9.0 g/m$^2$, followed by drying with a cylinder dryer, and then heat calendering with a heat calendering apparatus having metal roll-resin roll (Shore hardness 992) constitution under the conditions of a metal roll temperature of 195° C., a liner pressure of 100 kN/m, a processing speed of 5 m/min and 1 nip, to obtain a non-woven fabric base material with a thickness of 13 μm.

TABLE 4

|  |  | Example 14 | Example 15 | Example 16 | Example 17 | Example 18 | Example 19 | Example 20 | Example 21 |
|---|---|---|---|---|---|---|---|---|---|
| Binder fiber | Fiber diameter (μm) | 1.6 | 2.8 | 2.8 | 2.8 | 2.8 | 2.8 | 2.8 | 2.8 |
|  | Fiber length (mm) | 1.5 | 1.5 | 1.0 | 2.5 | 1.5 | 1.5 | 1.5 | 1.5 |
|  | Content (mass %) | 20 | 20 | 20 | 20 | 10 | 30 | 20 | 20 |

TABLE 4-continued

|  |  | Example 14 | Example 15 | Example 16 | Example 17 | Example 18 | Example 19 | Example 20 | Example 21 |
|---|---|---|---|---|---|---|---|---|---|
| Crystallized PET fiber24 | Content (mass %) | 80 | 80 | 80 | 80 | 90 | 70 | 60 | 60 |
| Crystallized PET fiber16 |  |  |  |  |  |  |  |  |  |
| Crystallized PET fiber43 |  |  |  |  |  |  |  |  |  |
| Cellulose fiber |  |  |  |  |  |  |  | 20 |  |
| Aramid fiber |  |  |  |  |  |  |  |  | 20 |
| Tensile strength | (N/m) | 570 | 560 | 520 | 510 | 480 | 600 | 470 | 450 |
| Separator thickness | (μm) | 19 | 18 | 18 | 18 | 17 | 20 | 22 | 21 |
| Penetration-through of coating liquid |  | B | B | B | B | B | A | A | A |
| Internal resistance | (Ω) | 4.2 | 4.1 | 4.1 | 4.2 | 4.0 | 4.4 | 4.3 | 4.3 |
| Wrinkle |  | ○ | ○ | Δ | ○ | ○ | ○ | ○ | ○ |

TABLE 5

|  |  | Example 22 | Example 23 | Comparative Example 4 | Example 24 | Example 25 | Comparative Example 5 | Example 26 | Example 27 | Example 28 | Example 29 |
|---|---|---|---|---|---|---|---|---|---|---|---|
| Binder fiber | Fiber diameter (μm) | 1.3 | 4.3 | 2.8 | 2.8 | 2.8 | 2.8 | 2.8 | 2.8 | 2.8 | 2.8 |
|  | Fiber length (mm) | 1.5 | 1.5 | 1.5 | 1.5 | 0.5 | 3.0 | 2.8 | 1.5 | 1.5 | 1.5 |
|  | Content (mass %) | 30 | 30 | 5 | 40 | 30 | 30 | 30 | 30 | 20 | 20 |
| Crystallized PET fiber24 | Content (mass %) | 70 | 70 | 95 | 60 | 70 | 70 | 40 | 40 |  |  |
| Crystallized PET fiber16 |  |  |  |  |  |  |  |  |  | 80 |  |
| Crystallized PET fiber43 |  |  |  |  |  |  |  |  |  |  | 80 |
| Cellulose fiber |  |  |  |  |  |  |  | 30 |  |  |  |
| Aramid fiber |  |  |  |  |  |  |  |  | 30 |  |  |
| Tensile strength | (N/m) | 400 | 420 | 330 | 620 | 330 | 350 | 300 | 280 | 280 | 280 |
| Separator thickness | (μm) | 19 | 17 | 15 | 17 | 18 | 18 | 22 | 20 | 20 | 16 |
| Penetration-through of coating liquid |  | B | C | C | B | C | C | B | B | A | D |
| Internal resistance | (Ω) | 4.3 | 4.3 | 4.1 | 4.8 | 4.1 | 4.3 | 4.4 | 4.6 | 4.8 | 4.5 |
| Wrinkling |  | ○ | ○ | X | ○ | Δ | X | ○ | ○ | ○ | ○ |

[Tensile Strength]

Each of the non-woven fabric base materials of Examples and Comparative Examples was cut into a rectangle with 50 mm width and 200 mm length so that the long side thereof was along the flow direction, and each of specimens was elongated with a tabletop material testing instrument (trade name: STA-1150, supplied by Orientech Co., Ltd.) under the conditions of a grip distance of 100 mm and a tensile speed of 300 mm/min. A load value at the break of the specimen was defined as tensile strength. The result was shown in Tables 4 and 5.

[Wrinkling]

To simulate wrinkling during coating, the following experiment was carried out. That is, each of the non-woven fabric base materials in Examples and Comparative Examples was slit to a width of 250 mm and sent out at a unwinding speed of 3 m/min and a unwinding tension of 5 N, and thereafter it was changed its direction into a horizontal direction with a roll provided vertically above 2 m, and was finally wound up. The occurrence of wrinkles when the separator was wound up to 20 m length was examined and classified according to the following criteria.

○: No wrinkles occurred.

Δ: Wrinkles sometimes occurred, but disappeared when horizontal tension was applied.

x: Wrinkles sometimes occurred, and immediately re-ocurred even when horizontal tension was applied.

[Separator]

Onto each of the non-woven fabric base materials in Examples and Comparative Examples, a coating liquid with a non-volatile content of 40 mass % was coated with a rod coater so that the coating amount after drying was 10 g/m². The coating liquid contained 100 mass parts of magnesium hydroxide with an average particle diameter of 1.0 μm, 1.5 mass parts of styrene-butadiene latex and 1.0 mass part of carboxymethyl cellulose sodium. Here, a black-colored drawing sheet was used as an underlay.

[Penetration-Through of a Coating Liquid]

In the above-mentioned separator production, the amount of the coating liquid which penetrated through the non-woven fabric base material and thereafter adhered to the black-colored drawing sheet used as an underlay was examined and classified according to the following four criteria. The results are shown in Tables 4 and 5.

A No coating liquid adhered to the mount sheet.

B The coating liquid adhered in dots to the mount sheet (adhesion area of less than 10%).

C The penetrated-through coating liquid adhered to the mount sheet (adhesion area of 10% to 30%).

D A large amount of the penetrated-through coating liquid adhered to the mount sheet (adhesion area of more than 30%).

[Internal Resistance]

Using each separator produced, there was produced a lithium ion secondary battery for evaluation with a capacity of 30 mAh (electrode area: 15 cm$^2$, positive electrode: lithium manganese oxide, negative electrode: hard carbon, electrolyte solution: mixed solvent solution of 1M lithium hexafluorophosphate (LiPF$_6$) in ethylene carbonate (EC)/ diethyl carbonate (DEC) in a volume ratio of 3/7, pouch-type battery). Based on a terminal voltage $E_0$ after complete charging and a terminal voltage $E_1$ immediately after discharging for 10 seconds at 150 mA, the internal resistance was calculated by the following Formula 2. The results were shown in Tables 4 and 5.

$$R_1=(E_0-E_1)/0.15 \qquad \text{(Formula 2)}$$

Each of the non-woven fabric base materials produced in Examples 14-30 is corresponding to the non-woven fabric base material (1) which is composed mainly of a PET fiber, contains a PET binder fiber and a crystallized PET fiber, and has a content of 10 to 60 mass % of a PET binder fiber with a fiber length of 2.5 mm or less. Thus, wrinkles were not formed during coating or, even if formed, they could be corrected by adjusting horizontal tension. On the contrary, the non-woven fabric base material of Comparative Example 4 contained only 5 mass % of the PET binder fiber and the non-woven fabric base material of Comparative Example 5 contained the PET binder fiber with a long fiber length of 3.0 mm, and as a result, wrinkles were formed and were hard to be corrected.

Each of the non-woven fabric base materials produced in Examples 14-21 is also corresponding to the non-woven fabric base material (3) in which the content of the PET binder fiber (II) with an average fiber diameter of 1.5 to 2.8 μm and a fiber length of 1.0 to 2.5 mm was 10 to 30 mass %, the total content of the PET binder fiber (II) and the crystallized PET fiber was 80 to 100 mass %, and the average fiber diameter of the crystallized PET fiber was 2.0 to 4.0 μm. Thus, the tensile strength was high, the penetration-through of a coating liquid was little during coating an inorganic pigment on these non-woven fabric base materials, and the internal resistance of the lithium ion secondary battery separator was as low as 4.4Ω.

Since the non-woven fabric base material of Example 22 had a small fiber diameter of 1.3 μm of the PET binder fiber, the tensile strength was 400 N/m, which was low compared with those of the non-woven fabric base materials produced in Examples 14-21. Since the non-woven fabric base material of Example 23 had a large fiber diameter of 4.3 μm of the PET binder fiber, the tensile strength was 420 N/m, which was low compared with those of the non-woven fabric base materials produced in Examples 14-21. Since the non-woven fabric base material of Example 24 had a large content of 40 mass % of the PET binder fiber, the internal resistance of the lithium ion secondary battery separator produced by using it was 4.8Ω, which was high compared with those of the lithium ion secondary battery separators produced from the non-woven fabric base materials of Examples 14-21. Since the non-woven fabric base material of Example 25 had a small fiber length of 0.5 mm of the PET binder fiber, the tensile strength was 300 N/m, which was low compared with those of the non-woven fabric base materials of Examples 14-21. Since the non-woven fabric base materials of Examples 26 and 27 contained more than 20 mass % of the fiber other than the PET fiber, their tensile strengths were 300 N/m and 280 N/m, respectively, which were low compared with those of the non-woven fabric base materials of Examples 14-21. Since the non-woven fabric base material of Example 28 had a small fiber diameter of 1.6 μm of the crystallized PET fiber, the internal resistance of the lithium ion secondary battery separator produced by using it was 4.8Ω, which was high compared with those of the lithium ion secondary battery separators produced by using the non-woven fabric base materials of Examples 14-21. Since the non-woven fabric base material of Example 29 had a large fiber diameter of 4.3 μm of the crystallized PET fiber, the penetration-through of a coating liquid was more noticeable compared with the non-woven fabric base materials of Examples 14-21.

Examples 30-44, Comparative Examples 6-8

[PET Binder Fiber A11]

As a PET binder fiber A11, there was used a single-component type undrawn PET fiber (softening point of 120° C., melting point of 230° C.) with an average fiber diameter of 0.5 μm and a fiber length of 0.5 mm, which contained 3,5-dicarbomethoxy benzene sulfonic acid and diethylene glycol as copolymer components.

[PET Binder Fiber A12]

As a PET binder fiber A12, there was used a single-component type undrawn PET fiber (softening point of 120° C., melting point of 230° C.) with an average fiber diameter of 1.0 μm and a fiber length of 1.0 mm, which contained 3,5-dicarbomethoxy benzene sulfonic acid and diethylene glycol as copolymer components.

[PET Binder Fiber A13]

As a PET binder fiber A13, there was used a single-component type undrawn PET fiber (softening point of 120° C., melting point of 230° C.) with an average fiber diameter of 2.0 μm and a fiber length of 2.0 mm, which contained 3,5-dicarbomethoxy benzene sulfonic acid and diethylene glycol as copolymer components.

[PET Binder Fiber A14]

As a PET binder fiber A14, there was used a single-component type undrawn PET fiber (softening point of 120° C., melting point of 230° C.) with an average fiber diameter of 4.3 μm and a fiber length of 3.0 mm, which contained 3,5-dicarbomethoxy benzene sulfonic acid and diethylene glycol as copolymer components.

[PET Binder Fiber A15]

As a PET binder fiber A15, there was used a single-component type undrawn PET fiber (softening point of 120° C., melting point of 230° C.) with an average fiber diameter of 10.0 μm and a fiber length of 4.0 mm, which contained 3,5-dicarbomethoxy benzene sulfonic acid and diethylene glycol as copolymer components.

[PET Binder Fiber A16]

As a PET binder fiber A16, there was used a single-component type undrawn PET fiber (softening point of 120° C., melting point of 230° C.) with an average fiber diameter of 14.0 μm and a fiber length of 5.0 mm, which contained 3,5-dicarbomethoxy benzene sulfonic acid and diethylene glycol as copolymer components.

[PET Binder Fiber a17]

As a PET binder fiber a17, there was used a single-component type undrawn PET fiber (softening point of 120° C., melting point of 230° C.) with an average fiber diameter of 10.5 μm and a fiber length of 5.0 mm, which contained diethylene glycol as copolymer components.

[PET Binder Fiber a18]

As a PET binder fiber a18, there was used a core-sheath type heat-fusible PET fiber (melting point of sheath part: 110° C., core part: 250° C.) with an average fiber diameter of 10.1 μm and a fiber length of 5.0 mm, which contained diethylene glycol as a copolymer component.

In accordance with fiber materials and fiber blending ratios as shown in Table 6, each paper-making slurry was prepared. In Table 6, "B11" means a crystallized PET fiber with an average fiber diameter of 0.7 μm and a fiber length of 1.7 mm, which contained diethylene glycol as a copolymer component. "B12" means a crystallized PET fiber with an average fiber diameter of 2.5 μm and a fiber length of 3.0 mm, which contained diethylene glycol as a copolymer component. "B13" means a crystallized PET fiber with an average fiber diameter of 3.2 μm and a fiber length of 3.0 mm, which contained diethylene glycol as a copolymer component. "B14" means a crystallized PET fiber with an average fiber diameter of 5.5 μm and a fiber length of 3.0 mm, which contained diethylene glycol as a copolymer component. "B15" means a crystallized PET fiber with an average fiber diameter of 7.8 μm and a fiber length of 5 mm, which contained diethylene glycol as a copolymer component. "C11" means a wholly aromatic polyamide fiber (copoly(para-phenylene-3,4'-oxydipheneleneterephthalic amide)) with a fineness of 0.75 dtex and a fiber length of 3 mm.

TABLE 6

| Slurry | Fiber blending ratio (mass %) |
|---|---|
| 17 | A11/B13 = 40/60 |
| 18 | A12/B13 = 40/60 |
| 19 | A13/B13 = 40/60 |
| 20 | A14/B13 = 40/60 |
| 21 | A15/B13 = 40/60 |
| 22 | A16/B13 = 40/60 |
| 23 | A14/B11/B12 = 5/10/85 |
| 24 | A14/B13/B14 = 10/45/45 |
| 25 | A14/B13/B15 = 20/40/40 |
| 26 | A14/B13 = 50/50 |
| 27 | A14/B13 = 55/45 |
| 28 | A14/B13 = 60/40 |
| 29 | A14/B13/C11 = 40/30/30 |
| 30 | A14/a17/B13 = 10/20/70 |
| 31 | A14/a18/B13 = 20/10/70 |
| 32 | a17/B13 = 40/60 |
| 33 | a18/B13 = 40/60 |

[Non-Woven Fabric Base Material]

Examples 30-44

Slurries 17-31 were paper-made by the wet-laid method with a cylinder wire and inclined wire combination paper making machine at a speed of 18 m/min to produce the non-woven fabric base materials of Examples 30-44 shown in Table 7. The thickness thereof was adjusted by conducting a heat calendering treatment with a heat calendering apparatus having metal roll-resin roll (Shore hardness D92) constitution under the conditions of a metal roll temperature of 195° C., a liner pressure of 200 kN/m, a processing speed of 10 m/min and 1 nip.

Comparative Example 6

Slurry 32 was paper-made by the wet-laid method with a cylinder wire and inclined wire combination paper making machine at a speed of 18 m/min to produce the non-woven fabric base material of Comparative Example 6 shown in Table 7. The thickness thereof was adjusted by conducting a heat calendering treatment with a heat calendering apparatus having metal roll-resin roll (Shore hardness D92) constitution under the conditions of a metal roll temperature of 195° C., a liner pressure of 200 kN/m, a processing speed of 10 m/min and 1 nip.

Comparative Example 7

Slurry 33 was paper-made by the wet-laid method with a cylinder wire and inclined wire combination paper making machine at a speed of 18 m/min to produce the non-woven fabric base material of Comparative Example 7 shown in Table 7.

Comparative Example 8

The non-woven fabric base material of Comparative Example 7 was subjected to a heat calendering treatment with a heat calendering apparatus having metal roll-resin roll (Shore hardness D92) constitution under the conditions of a metal roll temperature of 195° C., a liner pressure of 200 kN/m, a processing speed of 10 m/min and 1 nip to produce the non-woven fabric base material of Comparative Example 8 shown in Table 7.

TABLE 7

| | Slurry | Basis weight (g/m$^2$) | Thickness (μm) | Density (g/cm$^3$) |
|---|---|---|---|---|
| Example 30 | 17 | 10 | 15 | 0.67 |
| Example 31 | 18 | 10 | 15 | 0.67 |
| Example 32 | 19 | 10 | 15 | 0.67 |
| Example 33 | 20 | 10 | 15 | 0.67 |
| Example 34 | 21 | 10 | 16 | 0.63 |
| Example 35 | 22 | 10 | 16 | 0.63 |
| Example 36 | 23 | 6 | 10 | 0.60 |
| Example 37 | 24 | 8 | 13 | 0.62 |
| Example 38 | 25 | 10 | 16 | 0.63 |
| Example 39 | 26 | 16 | 25 | 0.64 |
| Example 40 | 27 | 18 | 27 | 0.67 |
| Example 41 | 28 | 20 | 30 | 0.67 |
| Example 42 | 29 | 12 | 18 | 0.67 |
| Example 43 | 30 | 12 | 18 | 0.67 |
| Example 44 | 31 | 12 | 18 | 0.67 |
| Comparative Example 6 | 32 | 10 | 16 | 0.63 |
| Comparative Example 7 | 33 | 10 | 30 | 0.33 |
| Comparative Example 8 | 33 | 10 | 16 | 0.63 |

[Tensile Strength]

Each of the non-woven fabric base materials of Examples and Comparative Examples was cut into a rectangle with 50 mm width and 200 mm length so that the long side thereof was along the flow direction, and each of specimens was elongated with a tabletop material testing instrument (trade name: STA-1150, supplied by Orientech Co., Ltd.) under the conditions of a grip distance of 100 mm and a tensile speed of 300 mm/min. A load value at the break of the specimen was defined as tensile strength. The tensile strength was measured at five or more points per specimen, and an average value of all values measured was calculated. When the tensile strength was 700 N/m or more, the evaluation thereof was expressed as "A". When the tensile strength was 600 N/m or more and less than 700 N/m, it was expressed as "B". When tensile strength was less than 600 N/m, it was expressed as "C". The results were shown in Table 8.

[Electrolyte Retention]

Each of the non-woven fabric base materials of Examples and Comparative Examples was cut into a 100 mm×100 mm specimen, and the weight (W1) thereof was measured, then the specimen was immersed in propylene carbonate for 1 minute, then hanged for 1 minute, and the weight (W2) thereof was measured, then electrolyte retention ratio was 1.5 calculated by the Formula 1 below.

Electrolyte retention ratio (%)=(W2−W1)/W1×100    (Formula 1)

The electrolyte retention ratio was measured 2 or more times per specimen. When an average value of the measured values was 300% or more, the evaluation thereof was expressed as "A". When said value was 270% or more and less than 300%, it was expressed as "B". When said value was less than 270%, it was expressed as "C".

[Production of a Separator]

100 mass parts of boehmite with a volume average particle diameter of 0.9 μm and a BET specific surface area of 5.5 m$^2$/g was dispersed into 150 mass parts of water to prepare a dispersion, to which was added 75 mass parts of an aqueous solution containing 2 mass % of carboxymethyl cellulose sodium salt, in which the viscosity of an aqueous 1 mass % solution thereof at 25° C. was 200 mPa·s, followed by stirring. To the resulting mixture was added 10 mass parts of an emulsion (solid concentration: 50 mass %) of carboxy-modified styrene-butadiene copolymer resin with a glass transition temperature of −18° C. and a volume average particle diameter of 0.2 μm, followed by stirring. Finally water was added to adjust a solid concentration to 25 mass % to produce a coating liquid A.

Using a reverse-type gravure coater as a coating machine, the coating liquid A was one side coated onto the resin roll surface of each of the non-woven fabric base materials of Examples and Comparative Examples at a line speed of 30 m/min so that a coating amount of the liquid was 47 g/m$^2$. Each of coated non-woven fabric base materials was dried by blowing hot air of 90° C. thereto with a floating air dryer directly connected to the reverse-type gravure coater, to produce a separator.

[Production of a Battery for Evaluation]

Using each separator produced, there was produced a battery for evaluation with a capacity of 30 mAh, in which a positive electrode was lithium manganese oxide, a negative electrode was mesocarbon microbeads and an electrolyte solution was a mixed solvent solution of 1 mol/L of lithium hexafluorophosphate (LiPF$_6$) in diethylene carbonate (DEC)/ethylene carbonate (EC) in a volume ratio of 3/7.

[Evaluation of Internal Resistance]

Each battery produced was firstly subjected to the running-in charging and discharging of 5 cycles under the sequence of "constant electric current charging of 60 mA→constant electric voltage charging of 4.2 v (1 hour)→constant electric current discharging of 60 mA→toward next cycle after reaching 2.8 v". Next, it was subjected to the charging and discharging under the sequence of "constant electric current charging of 60 mA→constant electric voltage charging of 4.2 v (1 hour)→constant electric current discharging of 6 mA for 30 minutes (discharging amount of 3 mAh)", followed by measuring a voltage (voltage a) just before the end of the discharging. Then, it was subjected to the charging and discharging under the sequence of "constant electric current charging of 60 mA→constant electric voltage charging of 4.2 v (1 hour)→constant electric current discharging of 90 mA for 2 minutes (The discharging amount of 3 mAh)" followed by measuring a voltage (voltage b) just before the end of the discharging. Based on the measured voltages a and b, each internal resistance was calculated by the following Formula 3.

Internal resistance Ω=(Voltage a−Voltage b)/(90 mA−6 mA)    (Formula 3)

A: Internal resistance was less than 4Ω
B: Internal resistance was 4Ω or more to less than 5Ω
C: Internal resistance was 5Ω or more

TABLE 8

|  | Tensile strength (N/m) | Electrolyte retention | Separator Thickness (μm) | Internal resistance (Ω) |
| --- | --- | --- | --- | --- |
| Example 30 | B | A | 22 | A |
| Example 31 | A | A | 21 | A |
| Example 32 | A | A | 20 | A |
| Example 33 | A | A | 18 | A |
| Example 34 | A | A | 18 | A |
| Example 35 | B | A | 17 | A |
| Example 36 | B | A | 15 | A |
| Example 37 | A | A | 15 | A |
| Example 38 | A | A | 18 | A |
| Example 39 | A | A | 31 | A |
| Example 40 | A | A | 34 | A |
| Example 41 | A | B | 38 | B |
| Example 42 | A | A | 26 | A |
| Example 43 | A | B | 23 | B |
| Example 44 | A | A | 22 | A |
| Comparative Example 6 | A | C | 18 | C |
| Comparative Example 7 | C | A | 30 | A |
| Comparative Example 8 | A | C | 17 | C |

Each of the non-woven fabric base materials of Examples 30-44 shown in Table 8 is corresponding to the non-woven fabric base material (4) which is composed mainly of a PET fiber and contains 3,5-dicarbomethoxy benzene sulfonic acid as a copolymer component. Thus, the strength of the non-woven fabric base material was high, the electrolyte retention was excellent and the resistance of the separator was extremely low.

On the other hand, the non-woven fabric base material produced in Comparative Example 6 did not contain the PET binder fiber containing 3,5-dicarbomethoxy benzene sulfonic acid as a copolymer component, and as a result, the binder fibers fill up the pores inside the non-woven fabric base material and the electrolyte retention worsened. Further, the resistance of the separator became high.

Each of the non-woven fabric base materials produced in Comparative Examples 7 and 8 did not contain the PET binder fiber containing 3,5-dicarbomethoxy benzene sulfonic acid as a copolymer component, and as a result, the non-woven fabric base material of Comparative Example 7 had lower strength before the heat calendering treatment, and the non-woven fabric base material of Comparative Example 8 had worse electrolyte retention and higher resistance of the separator after the heat calendering treatment.

The non-woven fabric base material produced in Example 30 had a slightly small fiber diameter and a slightly small fiber length of the PET binder fiber containing 3,5-dicarbomethoxy benzene sulfonic acid as a copolymer component, and as a result, it was observed that the fibers slightly fell out of the non-woven fabric base material, and the tensile strength became slightly low compared with those of the non-woven fabric base materials of Example 31-34 and 37-44.

The non-woven fabric base material produced in Example 35 had a slightly large fiber diameter of the PET binder fiber containing 3,5-dicarbomethoxy benzene sulfonic acid as a copolymer component, and as a result, the number of the fiber in the thickness direction slightly decreased and the tensile strength became slightly low compared with those of the non-woven fabric base materials produced in Examples 31-34 and 37-44.

The non-woven fabric base material produced in Example 36 had a slightly small content of PET binder fiber containing 3,5-dicarbomethoxy benzene sulfonic acid as a copolymer component and a slightly high basis weight thereof, and as a result, the tensile strength became low compared with those of the non-woven fabric base materials of Examples 31-34 and 37-44.

The non-woven fabric base material produced in Example 41 had a slightly large content of PET binder fiber containing 3,5-dicarbomethoxy benzene sulfonic acid as a copolymer component, and as a result, filled parts of pores were observed inside the non-woven fabric base material and the electrolyte retention became slightly low and the resistance of the separator became slightly high compared with those of the non-woven fabric base materials of Examples 30-40, 42 and 44.

In the non-woven fabric base material produced in Example 43, both of the PET binder fiber containing 3,5-dicarbomethoxy benzene sulfonic acid as a copolymer component and the PET binder fiber not containing 3,5-dicarbomethoxy benzene sulfonic acid as a copolymer component were used. However, since the content of the PET binder fiber not containing 3,5-dicarbomethoxy benzene sulfonic acid as a copolymer component was slightly larger, filled parts of pores were observed inside the non-woven fabric base material, and as a result, the electrolyte retention became slightly low and the resistance of the separator became slightly high compared with those of the non-woven fabric base materials in Examples 30-40, 42 and 44.

INDUSTRIAL UTILITY

As an example in which the non-woven fabric base material of the present invention is utilized, a lithium ion secondary battery separator is suitable.

What is claimed is:

1. A non-woven fabric base material for a lithium ion secondary battery separator composed mainly of a polyethylene terephthalate fiber, characterized in that:
the non-woven fabric base material comprises a polyethylene terephthalate binder fiber staple and a crystallized polyethylene terephthalate fiber, and the content of a polyethylene terephthalate binder fiber staple having an average fiber diameter of 1.5 to 10.0 µm and a fiber length of 2.5 mm or less is 10 to 35 mass %.

2. The non-woven fabric base material for a lithium ion secondary battery separator recited in claim 1, wherein the content of a polyethylene terephthalate binder staple fiber having an average fiber diameter of 2.0 to 10.0 µm and a fiber length of 0.5 to 2.5 mm is 25 to 35 mass %.

3. A lithium ion secondary battery separator, comprising the non-woven fabric base material for a lithium ion secondary battery separator recited in claim 2, wherein the non-woven fabric base material for a lithium ion secondary battery separator has been subjected to at least one treatment selected from the group consisting of:
a treatment in which a coating liquid containing an inorganic pigment is coated;
a treatment in which a coating liquid containing an organic particle is coated;
a treatment in which a microporous resin film is laminated;
a treatment in which a fine fiber layer is formed by an electrospinning method; and
a treatment in which a solid electrolyte or a gel-like electrolyte is coated.

4. The non-woven fabric base material for a lithium ion secondary battery separator recited in claim 1,
wherein the content of a polyethylene terephthalate binder fiber staple having an average fiber diameter of 1.5 to 2.8 µm and a fiber length of 1.0 to 2.5 mm is 10 to 30 mass %;
the total content of the polyethylene terephthalate binder fiber staple and the crystallized polyethylene terephthalate fiber is 80 to 100 mass %; and
the average fiber diameter of crystallized polyethylene terephthalate fiber is 2.0 to 4.0 µm.

5. A lithium ion secondary battery separator, comprising the non-woven fabric base material for a lithium ion secondary battery separator recited in claim 4, wherein the non-woven fabric base material for a lithium ion secondary battery separator has been subjected to at least one treatment selected from the group consisting of:
a treatment in which a coating liquid containing an inorganic pigment is coated;
a treatment in which a coating liquid containing an organic particle is coated;
a treatment in which a microporous resin film is laminated;
a treatment in which a fine fiber layer is formed by an electrospinning method; and
a treatment in which a solid electrolyte or a gel-like electrolyte is coated.

6. The non-woven fabric base material for a lithium ion secondary battery separator recited in claim 1:
wherein the non-woven fabric base material comprises a polyethylene terephthalate binder fiber staple containing 3,5-dicarbomethoxy benzene sulfonic acid as a copolymer component.

7. A lithium ion secondary battery separator, comprising the non-woven fabric base material for a lithium ion secondary battery separator recited in claim 6, wherein the non-woven fabric base material for a lithium ion secondary battery separator has been subjected to at least one treatment selected from the group consisting of:
a treatment in which a coating liquid containing an inorganic pigment is coated;
a treatment in which a coating liquid containing an organic particle is coated;
a treatment in which a microporous resin film is laminated;
a treatment in which a fine fiber layer is formed by an electrospinning method; and
a treatment in which a solid electrolyte or a gel-like electrolyte is coated.

8. A lithium ion secondary battery separator, comprising the non-woven fabric base material for a lithium ion secondary battery separator recited in claim 1, wherein the non-woven fabric base material for a lithium ion secondary battery separator has been subjected to at least one treatment selected from the group consisting of:
- a treatment in which a coating liquid containing an inorganic pigment is coated;
- a treatment in which a coating liquid containing an organic particle is coated;
- a treatment in which a microporous resin film is laminated;
- a treatment in which a fine fiber layer is formed by an electrospinning method; and
- a treatment in which a solid electrolyte or a gel-like electrolyte is coated.

* * * * *